United States Patent
Kobayashi et al.

(10) Patent No.: US 10,298,082 B2
(45) Date of Patent: May 21, 2019

(54) INSULATING COMPONENT OF MOTOR

(71) Applicant: FANUC CORPORATION, Yamanashi (JP)

(72) Inventors: Kouji Kobayashi, Yamanashi (JP); Takeshi Tamaki, Yamanashi (JP); Koutarou Yamada, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 141 days.

(21) Appl. No.: 15/487,035

(22) Filed: Apr. 13, 2017

(65) Prior Publication Data

US 2017/0302120 A1    Oct. 19, 2017

(30) Foreign Application Priority Data

Apr. 14, 2016 (JP) ................. 2016-081248

(51) Int. Cl.
*H02K 3/34* (2006.01)
*H02K 3/30* (2006.01)
(Continued)

(52) U.S. Cl.
CPC ............ *H02K 3/345* (2013.01); *H02K 3/30* (2013.01); *H02K 3/325* (2013.01); *H02K 3/38* (2013.01);
(Continued)

(58) Field of Classification Search
CPC ............ H02K 3/30; H02K 3/32; H02K 3/325; H02K 3/34; H02K 3/345; H02K 3/38;
(Continued)

(56) References Cited

U.S. PATENT DOCUMENTS

2007/0001525 A1* 1/2007 Schneider ............ H02K 3/345
310/71
2009/0289520 A1* 11/2009 Takeshita ............ H02K 3/487
310/214
(Continued)

FOREIGN PATENT DOCUMENTS

| JP | S5527921 U | 2/1980 |
|----|------------|--------|
| JP | H01134950 U | 9/1989 |
| JP | 2000-333399 A | 11/2000 |
| JP | 2009-284641 A | 12/2009 |

OTHER PUBLICATIONS

An Office Action; "Notification of Reasons for Refusal," mailed by the Japanese Patent Office dated Mar. 27, 2018, which corresponds to Japanese Patent Application No. 2016-081248 and is related to U.S. Appl. No. 15/487,035 with English language translation.

*Primary Examiner* — Tran N Nguyen
(74) *Attorney, Agent, or Firm* — Studebaker & Brackett PC

(57) ABSTRACT

To provide an insulating component of a motor formed of a single component capable of ensuring insulating properties. An insulating component (2) forms a motor that comprises a stator (1), a stator housing (4) attached to the stator (1), multiple windings (14) arranged in the stator (1), and a wiring board (3) arranged at one end of the stator (1) in an axis direction of the stator (1) and used for wiring of the windings (14). The insulating component (2) comprises: a first insulating wall (21) arranged between adjacent ones of the windings (14) of different phases and electrically insulating the adjacent windings (14); and a second insulating wall (22) arranged between the windings (14) and the wiring board (3) and electrically insulating the windings (14) and the wiring board (3).

5 Claims, 8 Drawing Sheets

(51) Int. Cl.
    *H02K 11/00*         (2016.01)
    *H02K 3/32*          (2006.01)
    *H02K 3/38*          (2006.01)
    *H02K 3/52*          (2006.01)

(52) U.S. Cl.
    CPC ......... *H02K 3/522* (2013.01); *H02K 11/0094* (2013.01); *H02K 2203/03* (2013.01)

(58) Field of Classification Search
    CPC   H02K 3/46; H02K 3/48; H02K 3/487; H02K 3/50; H02K 3/52; H02K 3/522; H02K 15/02
    See application file for complete search history.

(56) References Cited

U.S. PATENT DOCUMENTS

| | | | | |
|---|---|---|---|---|
| 2009/0324435 | A1* | 12/2009 | Sears | H02K 3/522 |
| | | | | 417/423.7 |
| 2010/0264774 | A1* | 10/2010 | Tokunaga | H02K 3/522 |
| | | | | 310/215 |
| 2012/0187797 | A1* | 7/2012 | Van Tiem | H02K 3/325 |
| | | | | 310/215 |
| 2013/0149134 | A1* | 6/2013 | Kobayashi | F04D 25/0613 |
| | | | | 415/208.2 |
| 2014/0248165 | A1* | 9/2014 | Chang | F04D 25/0646 |
| | | | | 417/354 |

* cited by examiner

INSULATING COMPONENT OF MOTOR

This application is based on and claims the benefit of priority from Japanese Patent Application No. 2016-081248, filed on 14 Apr. 2016, the content of which is incorporated herein by reference.

BACKGROUND OF THE INVENTION

Field of the Invention

The present invention relates to an insulating component of a motor.

Related Art

In motors used in various industrial devices in recent years, windings attached to stators have been arranged more densely for purposes of further size reduction and higher performance. However, densely arranging the windings causes the risk of contact of a winding with a teeth unit, or contact between adjacent windings of different phases.

Hence, a stator has been required to have improved insulating properties in terms of safety. In this regard, various stators having insulating structures have been suggested (see patent document 1, for example). Patent document 1 recites that the insulating properties of a stator can be improved by inserting insulating paper between the phases of windings.

Patent Document 1: Japanese Unexamined Patent Application, Publication No. 2000-333399

SUMMARY OF THE INVENTION

However, troublesome process of inserting insulating paper into each interphase has conventionally been required for ensuring interphase insulation between windings to involve huge man-hours. Likewise, an insulating member such as insulating paper has additionally been required to be inserted between a winding and a wiring board for ensuring insulation between the winding and the wiring board, requiring more man-hours and a higher parts count.

The present invention has been made in view of the above-described circumstances. The present invention is intended to provide an insulating component of a motor formed of a single component capable of ensuring insulating properties.

(1) An insulating component (an insulating component 2 described later, for example) according to the present invention forms a motor that comprises a stator (a stator 1 described later, for example), a stator housing (a stator housing 4 described later, for example) attached to the stator, multiple windings (windings 14 described later, for example) arranged in the stator, and a wiring board (a wiring board 3 described later, for example) arranged at one end of the stator in an axis direction of the stator and used for wiring of the windings. The insulating component comprises: a first insulating wall (a first insulating wall 21 described later, for example) arranged between adjacent ones of the windings of different phases and electrically insulating the adjacent windings; and a second insulating wall (a second insulating wall 22 described later, for example) arranged between the windings and the wiring board and electrically insulating the windings and the wiring board.

(2) The insulating component of the motor described in (1) may further comprise a third insulating wall (a third insulating wall 23 described later, for example) arranged between the wiring board and the stator housing and electrically insulating the wiring board and the stator housing.

(3) The insulating component of the motor described in (1) or (2) may further comprise a fixing unit (a fixing unit 20 or 29 described later, for example) for fixing the wiring board to a predetermined position of the stator.

(4) In the insulating component of the motor described in (3), at least one through hole (a through hole 31 described later, for example) may be formed in the wiring board, and the fixing unit (the fixing unit 20 described later, for example) may include a first pawl part (a first pawl part 20b described later, for example) passed through the through hole to be engaged with the wiring board.

(5) In the insulating component of the motor described in (3) or (4), the fixing unit (the fixing unit 29 described later, for example) may include second pawl parts in a pair (second pawl parts 29b described later, for example) engaged with plane-direction opposite ends (plane-direction opposite ends 32, 32 described later, for example) of the wiring board.

(6) In the insulating component of the motor described in any one of (1), (2), (3), (4), or (5), the insulating component may be made of resin.

The present invention is capable of providing an insulating component of a motor formed of a single component capable of ensuring insulating properties.

DETAILED DESCRIPTION OF THE INVENTION

Figure 1:
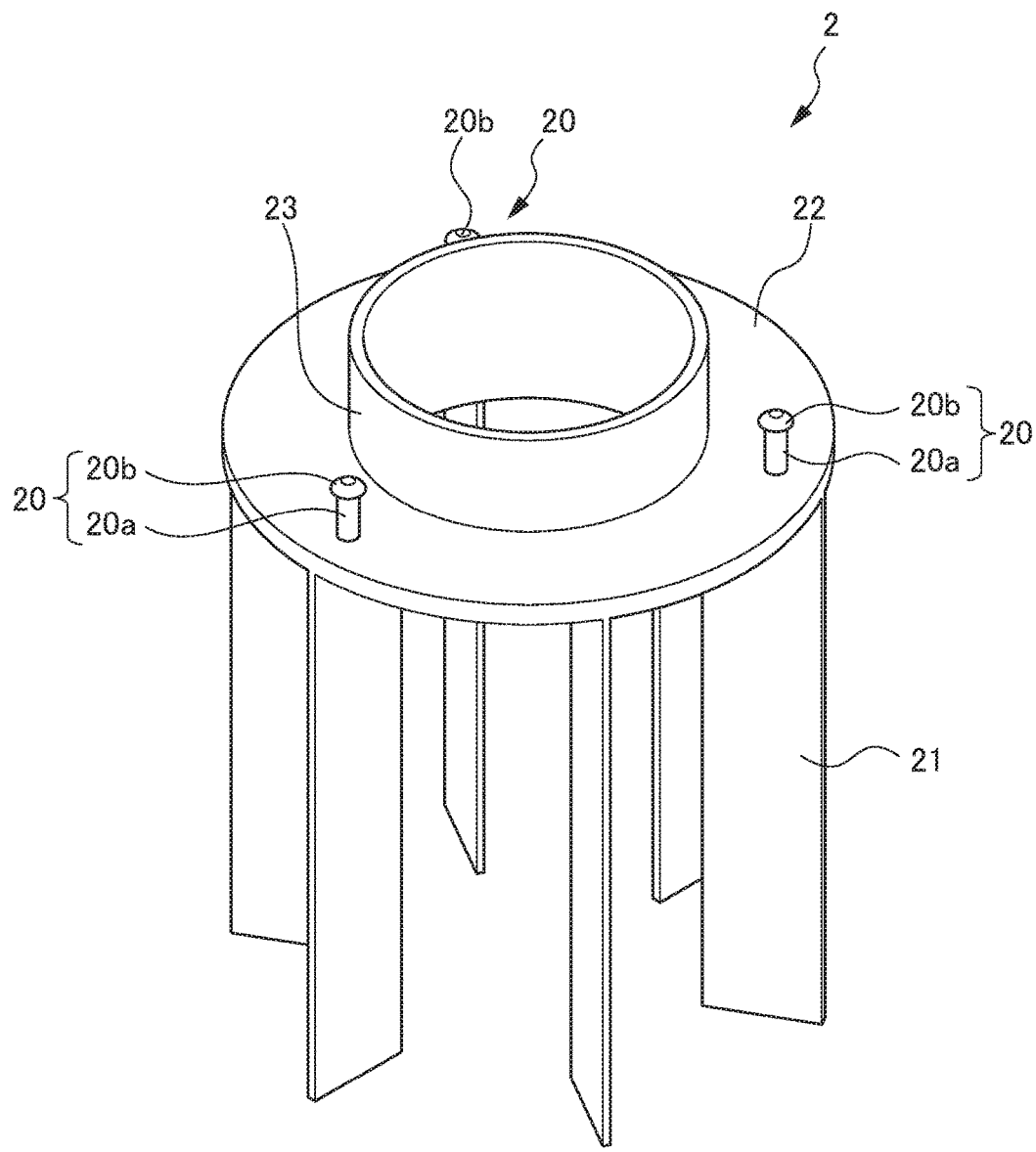
FIG. 1 is a perspective view of an insulating component according to an embodiment of the present invention.

An embodiment of the present invention will be described below in detail by referring to the drawings. An insulating component 2 according to this embodiment is arranged in a stator 1 of a motor not shown in the drawings and has the function of providing insulating properties to the motor. The insulating component 2 according to this embodiment further has the function of fixing a wiring board 3 to the stator 1.

Figure 2:
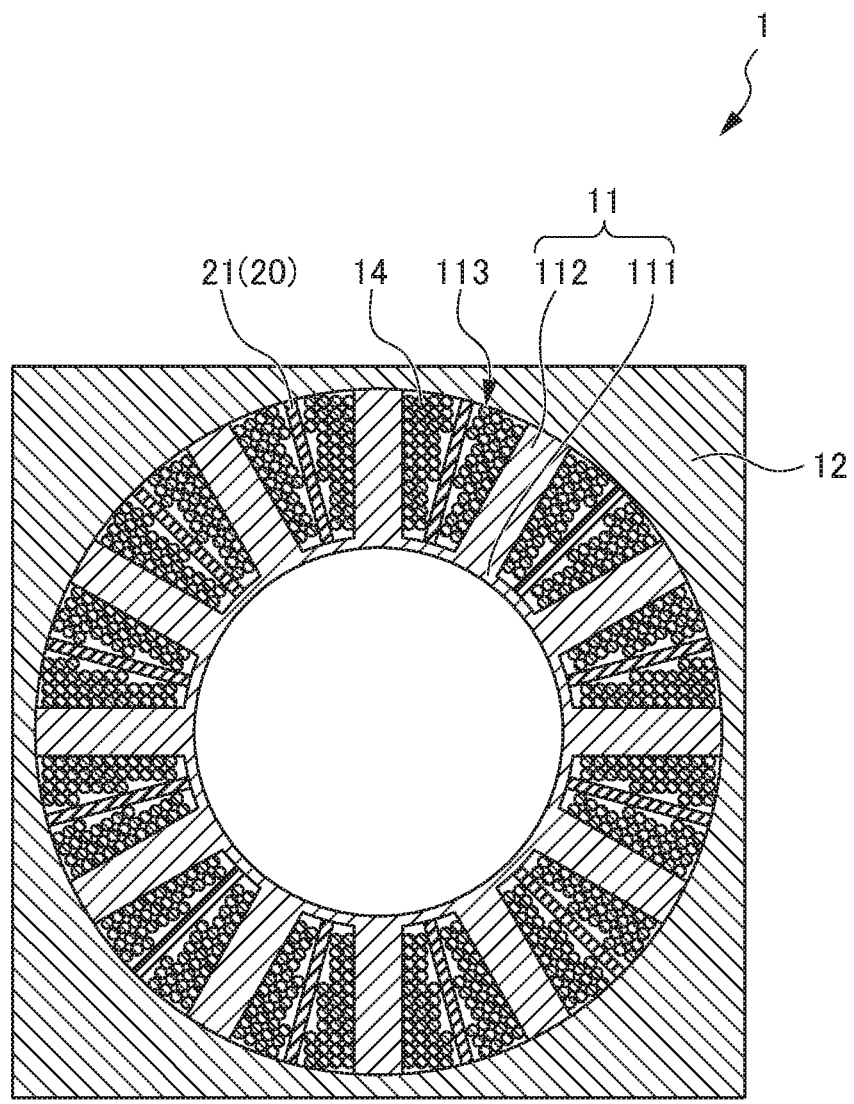
FIG. 2 is a radially-taken sectional view of a stator in which the insulating component according to this embodiment is arranged.
Figure 3:
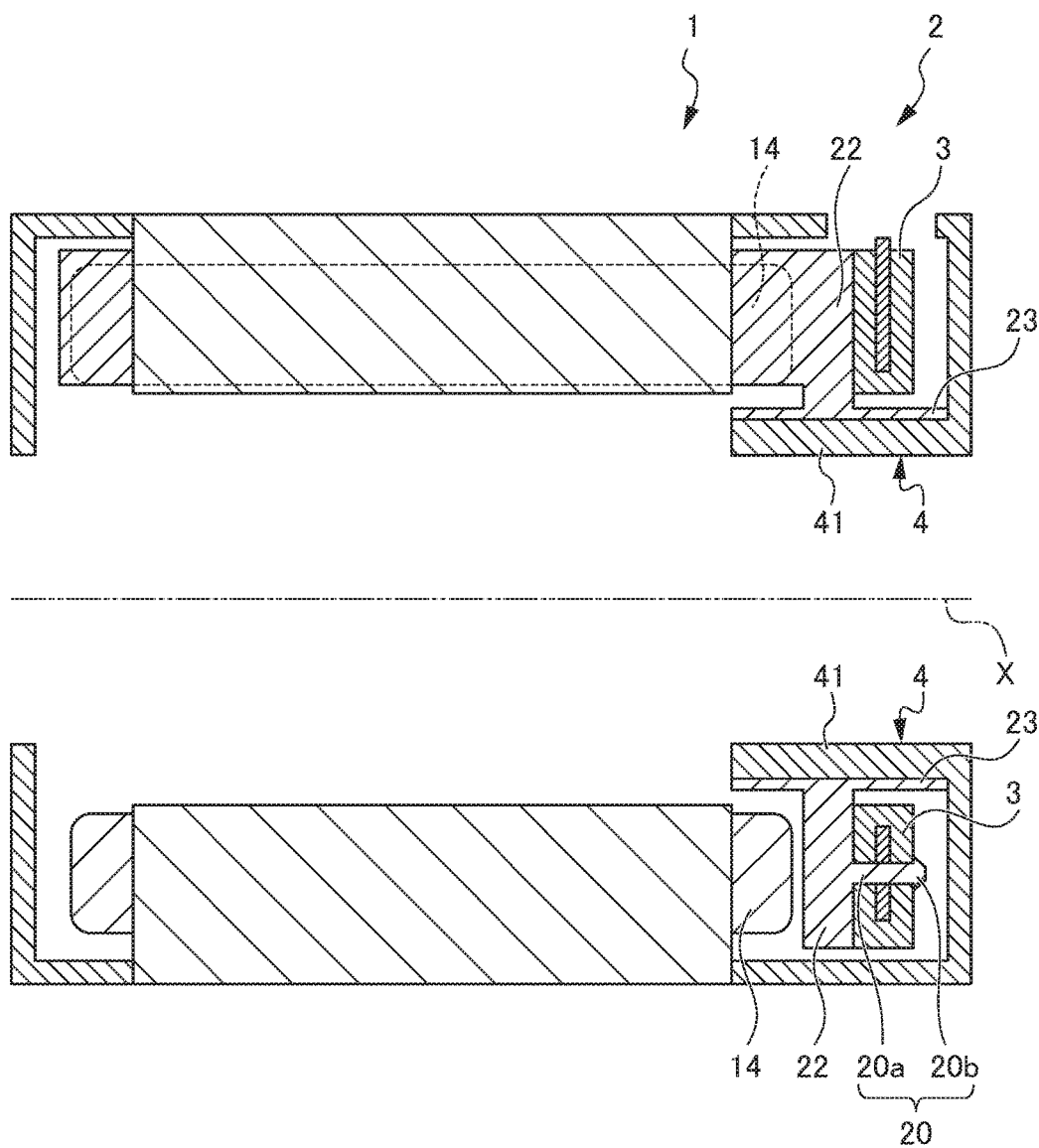
FIG. 3 is an axially-taken sectional view of the stator in which the insulating component according to this embodiment is arranged.

FIG. 1 is a perspective view of the insulating component 2 according to this embodiment. FIG. 2 is a radially-taken sectional view of the stator 1 in which the insulating component 2 according to this embodiment is arranged. FIG. 3 is an axially-taken sectional view of the stator 1 in which the insulating component 2 according to this embodiment is arranged. The configuration of the motor with the insulating component 2 according to this embodiment will be described first.

The motor according to this embodiment includes the stator 1, a rotor not shown in the drawings, the insulating component 2, the wiring board 3, a stator housing 4, and multiple windings 14.

The stator 1 is a molded stator split into a teeth unit 11 and an external unit 12. However, this is not the only configuration of the stator 1. The teeth unit 11 is formed by laminating multiple magnetic steel plates in the direction of an axis X corresponding to the center axis of the stator 1. The teeth unit 11 includes a circular cylindrical part 111 and multiple projection parts 112. By the presence of the circular cylindrical part 111 and the projection parts 112, multiple slots 113 are formed in a circumferential direction.

The circular cylindrical part 111 has a circular cylindrical shape and arranged at a radially inside position of the stator 1. The rotor not shown in the drawings is rotatably arranged in a hollow section of the circular cylindrical part 111. The projection part 112 is formed to project radially outwardly from the circular cylindrical part 111. The projection part 112 includes multiple projection parts 112 spaced uniformly in the circumferential direction of the circular cylindrical part 111. All the projection parts 112 extend from one end toward an opposite end of the stator 1 in the axis direction of the stator 1.

The external unit 12 is provided to cover the outer circumference of the teeth unit 11. The external unit 12 forms an external section of the stator 1. Like the teeth unit 11, the external unit 12 is formed by laminating multiple magnetic steel plates in the axis direction of the stator 1. As described above, the stator 1 according to this embodiment is a molded stator. Resin is poured into the slot 113 surrounded by the external unit 12 and the teeth unit 11 from the axis direction of the stator 1. As shown in FIG. 1, the external unit 12 according to this embodiment has a substantially square shape in a radially-taken sectional view. However, this is not the only shape of the external unit 12.

The multiple windings 14 are each wound a given number of turns around the projection part 112 of the teeth unit 11 to be arranged in the slot 113. In this way, the multiple windings 14 are arranged densely, side by side, in the circumferential direction of the stator 1, while being arranged to extend in the direction of the axis X of the stator 1. Windings 14 adjacent to each other in the circumferential direction have different phases. The winding 14 has one end routed to a wiring board connected to a power connector not shown in the drawings, thereby forming a three-phase connection. The opposite end of this winding 14 is connected to the opposite end of a different winding.

The wiring board 3 is arranged at one end of the stator 1 in the direction of the axis X. The wiring board 3 includes a power connector not shown in the drawings, and multiple connecting connectors not shown in the drawings connected to the power connector and to the corresponding windings 14. Specifically, the windings 14 are routed using the wiring board 3 to form a three-phase connection.

At least one through hole 31 is formed in the wiring board 3. A first pawl part 20b of a fixing unit 20 described later is passed through the through hole 31 to be engaged with the wiring board 3. Thus, the through hole 31 is formed at a position corresponding to the fixing unit 20.

The stator housing 4 is attached to the stator 1. The stator housing 4 includes a circular cylindrical insertion part 41 provided at the aforementioned one end of the stator 1 in the direction of the axis X where the wiring board 3 is arranged. The insertion part 41 is inserted into a hollow section of the stator 1 along the inner wall of the hollow section.

The insulating component 2 according to this embodiment will be described in detail next. As shown in FIG. 1, the insulating component 2 includes a first insulating wall 21, a second insulating wall 22, a third insulating wall 23, and the fixing unit 20. The first insulating wall 21, the second insulating wall 22, the third insulating wall 23, and the fixing unit 20 are integrated. Specifically, the insulating component 2 is a single component. The insulating component 2 is made of resin and formed integrally by resin molding, for example.

The first insulating wall 21 is formed of an elongated rectangular plate member, with one end in a lengthwise direction being coupled to the second insulating wall 22. The first insulating wall 21 is arranged in such a manner that the lengthwise direction of the first insulating wall 21 extends along the stator 1 from the one end toward the opposite end in the direction of the axis X, and that the short-side direction of the first insulating wall 21 extends in the radial direction of the stator 1 from a radially inside edge to a radially outside edge of the second insulating wall 22.

The first insulating wall 21 includes multiple first insulating walls 21 arranged in a radial pattern. As shown in FIG. 1, the first insulating walls 21 are each inserted between adjacent windings 14 of different phases. In this way, the first insulating walls 21 are arranged side by side and spaced uniformly in the circumferential direction of the stator 1. The first insulating walls 21 are each formed of an electrically-insulating member to allow electrical insulation between the adjacent windings 14 of different phases.

The presence of the first insulating wall 21 substantially eliminates a gap between phases of adjacent windings 14. This makes it unlikely that resin will be poured in from a radially outside position toward the winding 14 and its surrounding during injection molding of the stator 1. This restricts move of the winding 14 during the injection molding to reduce the probability of contact between windings 14 of different phases.

The second insulating wall 22 is formed of an annular plate member corresponding to the diameter of the hollow section of the stator 1. The multiple first insulating walls 21 are coupled by the second insulating wall 22 to become an integrated wall. As shown in FIG. 3, the second insulating wall 22 is arranged between the winding 14 and the wiring board 3. The second insulating wall 22 is formed of an electrically-insulating member to allow electrical insulation between the winding 14 and the wiring board 3.

The third insulating wall 23 is formed of a circular cylindrical member corresponding to the diameter of the hollow section of the stator 1. The third insulating wall 23 is coupled to an inner peripheral edge of the second insulating wall 22. As shown in FIG. 3, the third insulating wall 23 is arranged between the wiring board 3 and the insertion part 41 of the stator housing 4. The third insulating wall 23 is formed of an electrically-insulating member to allow electrical insulation between the wiring board 3 and the stator housing 4.

The fixing unit 20 includes at least one fixing unit 20 provided to the second insulating wall 22 at a position adjacent to the third insulating wall 23. According to this embodiment, the fixing unit 20 includes three fixing units 20 arranged on the annular second insulating wall 22 to be spaced uniformly in the circumferential direction. The fixing unit 20 has the function of fixing the wiring board 3 to a predetermined position of the stator 1. The fixing unit 20 will be described later by further referring to FIG. 4.

Figure 4:
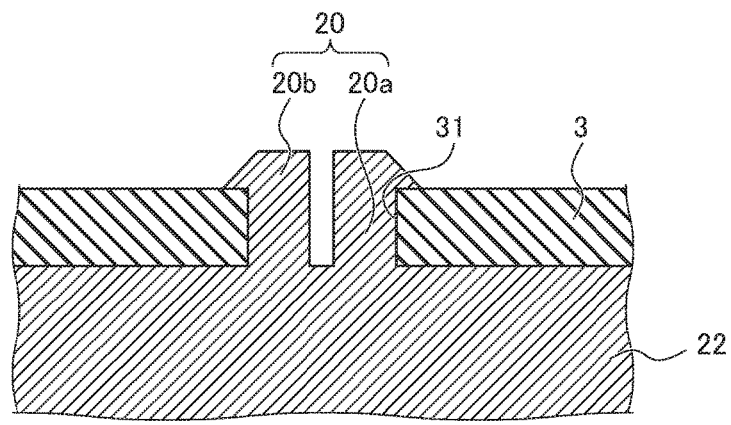
FIG. 4 is a sectional view showing an example of a fixing unit of the insulating component according to this embodiment.

FIG. 4 is a sectional view showing the fixing unit 20 as an example of a fixing unit of the insulating component 2 according to this embodiment. As shown in FIGS. 3 and 4, the fixing unit 20 includes a circular cylindrical part 20a having a circular cylindrical shape, and the first pawl part 20b provided at the tip of the circular cylindrical part 20a.

The first pawl part 20b is formed to extend from an entire outer peripheral edge at the tip of the circular cylindrical part 20a toward a direction orthogonal to the axis direction of the circular cylindrical part 20a. The first pawl part 20b has a tapered shape of a diameter reduced at a position closer to the tip. As shown in FIG. 4, the first pawl part 20b is passed through the through hole 31 formed in the wiring board 3 to be engaged with the wiring board 3. By the presence of the fixing unit 20 including the first pawl part 20b of such a fold-back structure, the wiring board 3 is fixed to the predetermined position of the stator 1.

Figure 5:
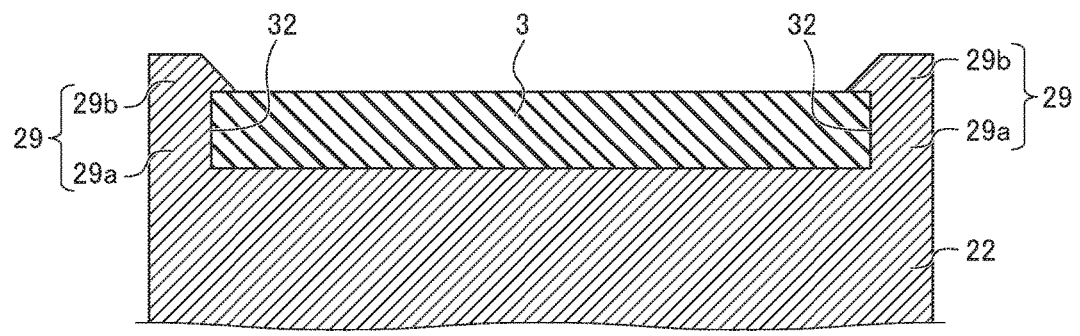
FIG. 5 is a sectional view showing a different example of the fixing unit of the insulating component according to this embodiment.

FIG. 5 is a sectional view showing a fixing unit 29 as a different example of the fixing unit of the insulating component 2 according to this embodiment. As shown in FIG. 5, the fixing unit 29 is used for fixing the wiring board 3 by making engagement with each of plane-direction opposite ends 32, 32 of the wiring board 3. The fixing unit 29 includes at least fixing units 29 in a pair provided at corresponding plane-direction opposite ends of the second insulating wall 22.

The fixing unit 29 includes a circular columnar part 29a having a circular columnar shape, and a second pawl part 29b provided at the tip of the circular columnar part 29a. The second pawl part 29b is formed to extend from a plane-direction inner area, which is part of an outer peripheral edge at the tip of the circular columnar part 29a, toward a direction orthogonal to the axis direction of the circular columnar part 29a. The second pawl part 29b has a tapered shape of a diameter reduced at a position closer to the tip. Specifically, the fixing units 29 in a pair includes the second pawl parts 29b formed on respective sides of the fixing units 29 facing each other. By the presence of the fixing units 29 including the second pawl parts 29b of such a fold-back structure, the second pawl parts 29b in a pair are engaged with the plane-direction opposite ends 32, 32 of the wiring board 3. In this way, the position of the wiring board 3 is determined and the wiring board 3 is fixed at the determined position while being caught between the fixing units 29 of the second insulating wall 22.

Figure 6:
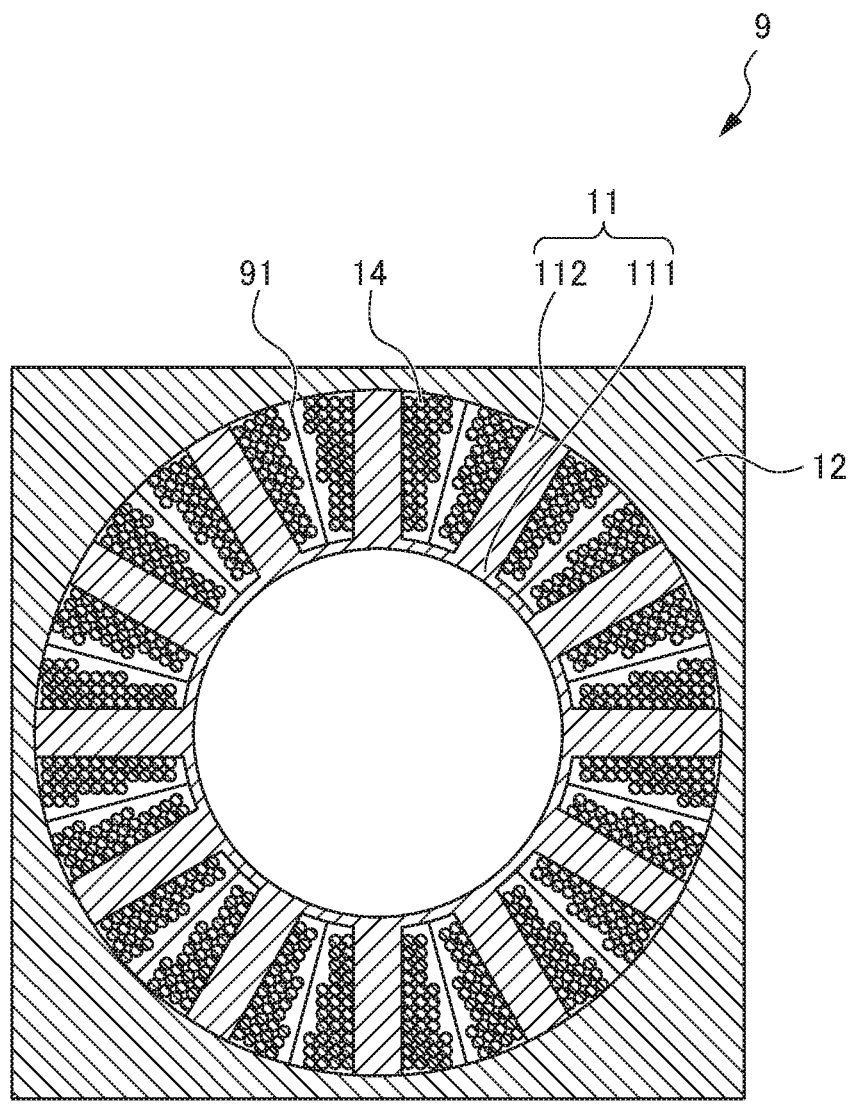
FIG. 6 is a radially-taken sectional view of a conventional stator in which insulating paper is arranged.

Various conventional insulating members will be described below by referring to the drawings. FIG. 6 is a radially-taken sectional view of a conventional stator 9 in which insulating paper 91 is arranged. As shown in FIG. 6, according to this conventional example, the insulating paper 91 is inserted into a gap formed between adjacent windings 14 of different phases. According to this conventional example, the insulating paper 91 having low rigidity and requiring troublesome work for its insertion should be inserted individually into each interphase.

Figure 7:
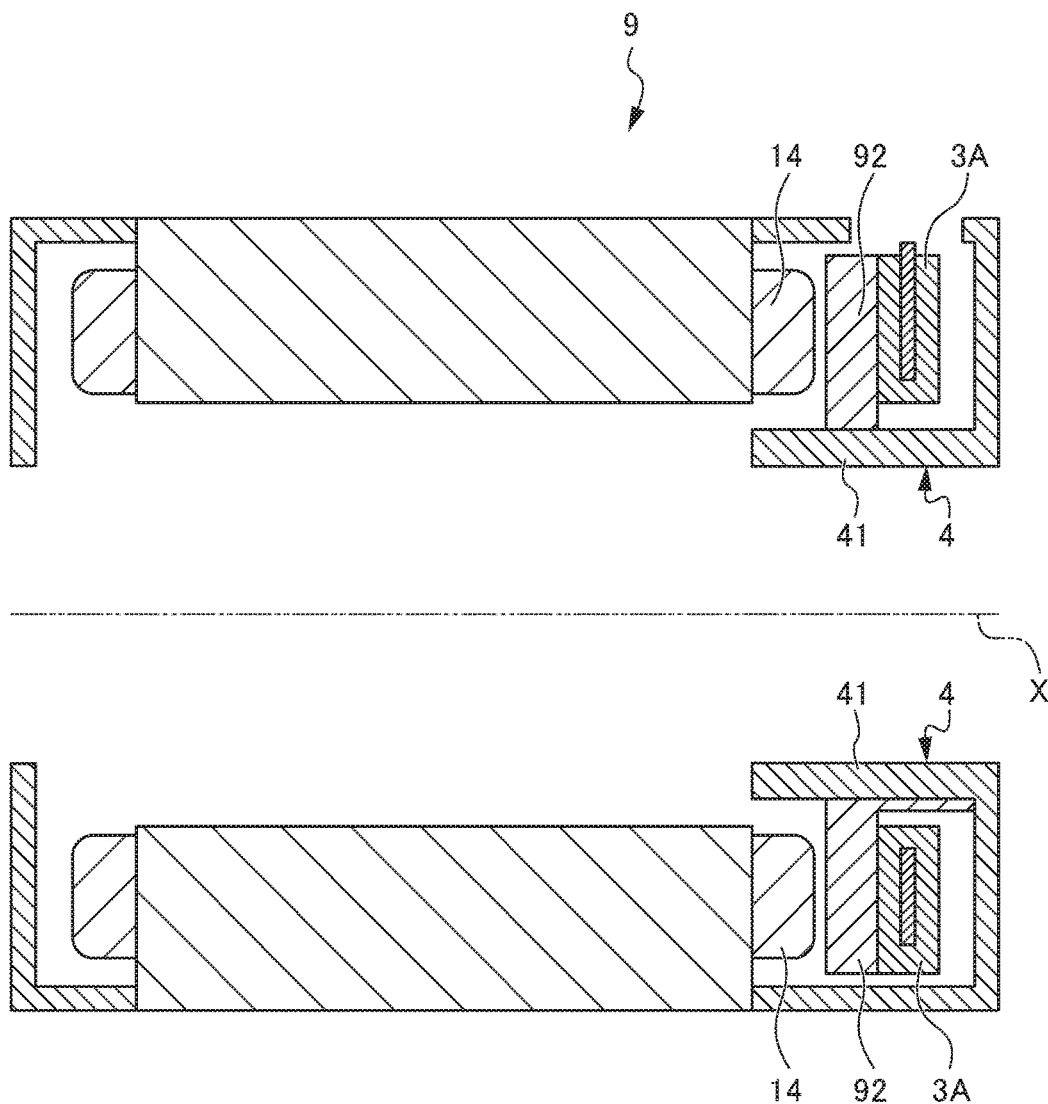
FIG. 7 is an axially-taken sectional view of a conventional stator in which a winding and an insulating member of a wiring board are arranged.
Figure 8:
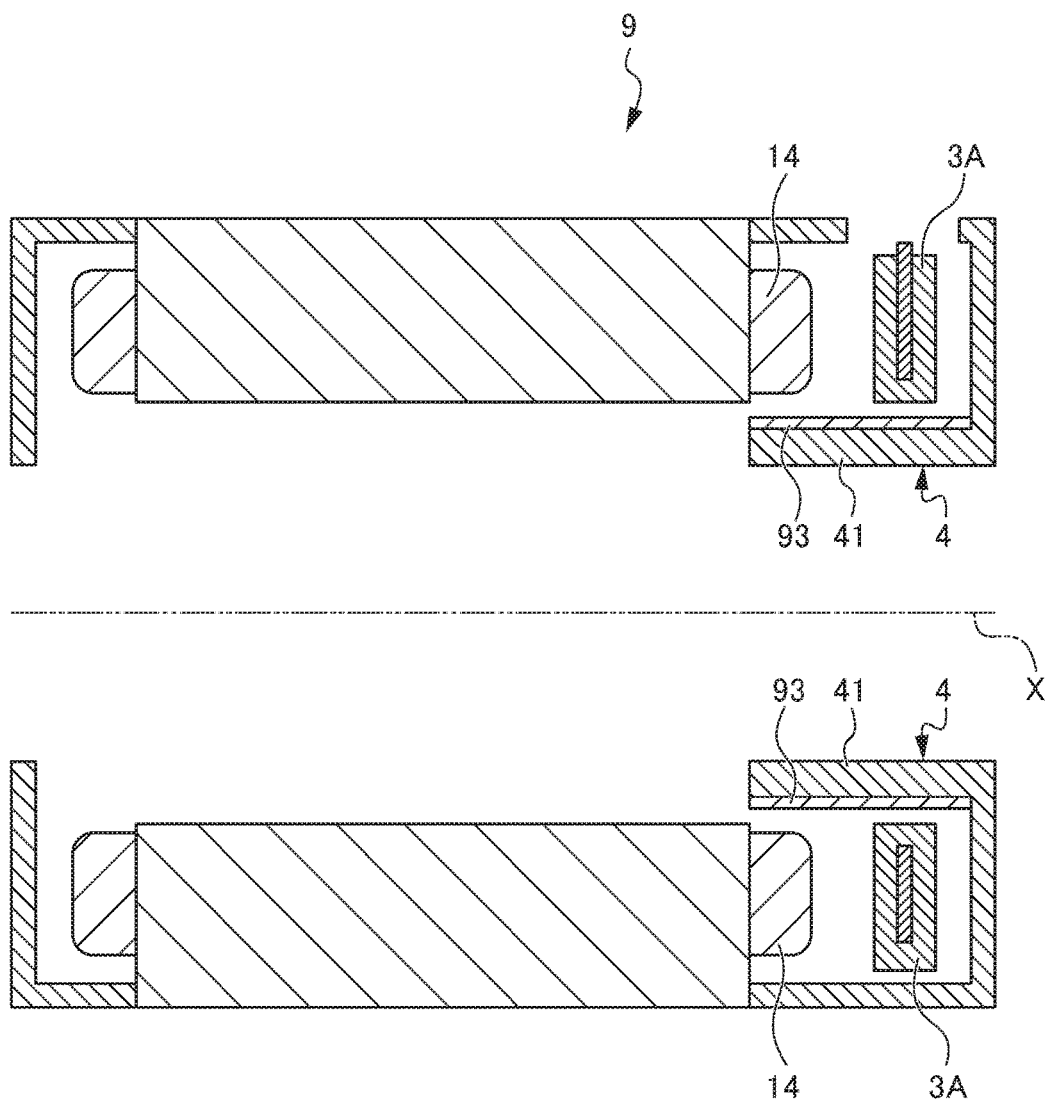
FIG. 8 is an axially-taken sectional view of a conventional stator in which a wiring board and an insulating member of a stator housing are arranged.

FIG. 7 is an axially-taken sectional view of a conventional stator 9 in which a winding 14 and an insulating member 92 of a wiring board 3A are arranged. FIG. 8 is an axially-taken sectional view of a conventional stator 9 in which a wiring board 3A and an insulating member 93 of a stator housing 4 are arranged. As understood from these conventional examples, the insulating member 92 or 93 should be inserted individually between the winding 14 and the wiring board 3A or between the wiring board 3A and the stator housing 4, as high insulating properties should be required between the winding 14 and the wiring board 3A and between the wiring board 3A and the stator housing 4.

As described above, an insulating member such as insulating paper has conventionally been required to be inserted individually into a place where insulation is required. In this regard, the insulating component 2 according to this embodiment is an integrated component formed of the first insulating wall 21, the second insulating wall 22, and the third insulating wall 23. Thus, the insulating component 2 can be inserted by work done only once.

Figure 9:
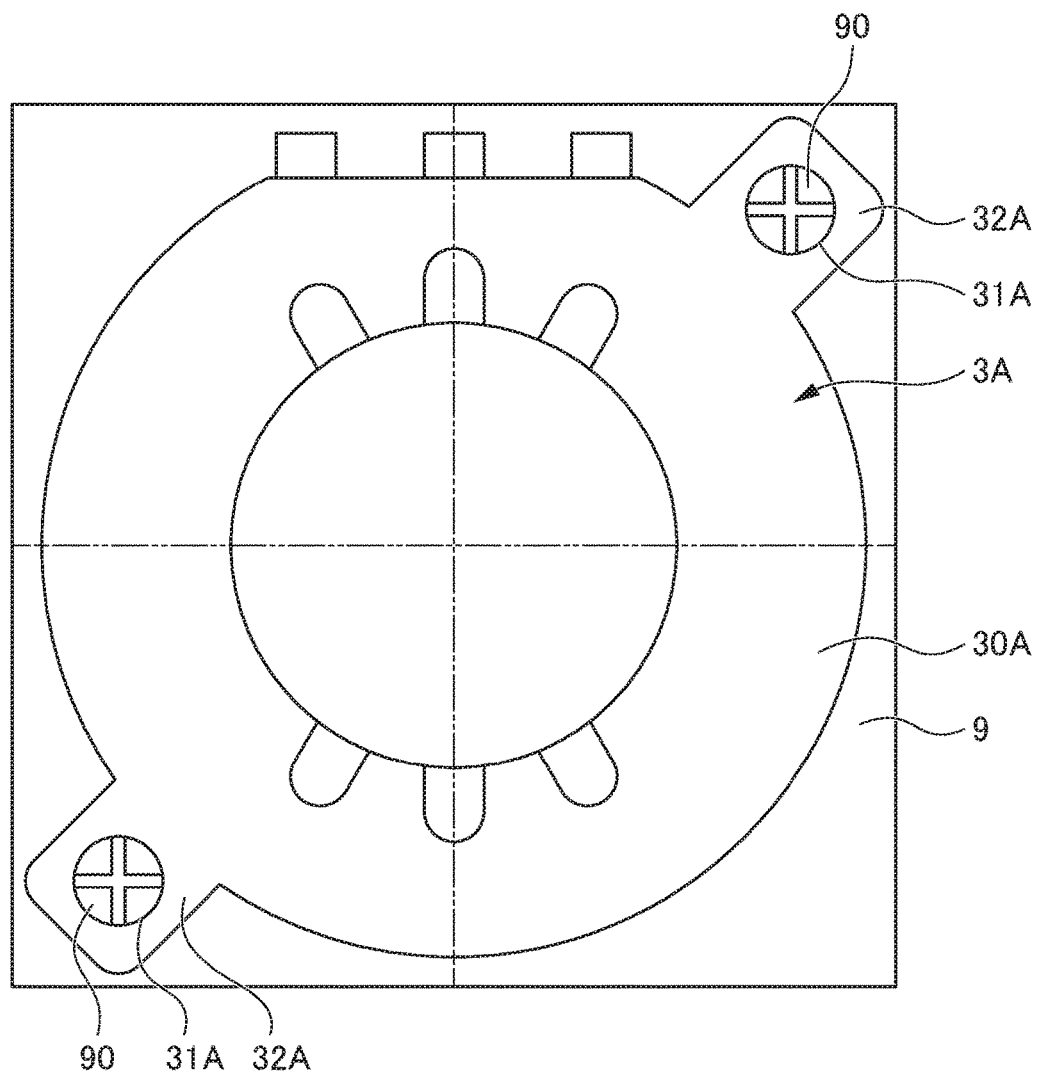
FIG. 9 is a plan view of a conventional stator to which a wiring board is attached.

FIG. 9 is a plan view of a conventional stator 9 to which a wiring board 3A is attached. As shown in FIG. 9, the conventional wiring board 3A includes a board body 30A, extending parts 32A, 32A in a pair facing each other, and screw hole parts 31A, 31A in a pair. Specifically, the wiring board 3A should be fixed by being fastened at the screw hole parts 31A, 31A formed at the corresponding extending parts 32A, 32A in a pair with screws 90, 90. By contrast, according to this embodiment, the wiring board 3 can be fixed using the insulating component 2 without requiring fastening with a screw.

This embodiment having the above-described configuration achieves the following effects. According to this embodiment, the insulating component 2 includes the first insulating wall 21 and the second insulating wall 22. The first insulating wall 21 is arranged between adjacent windings 14 of different phases and electrically insulates the adjacent windings 14. The second insulating wall 22 is arranged between the windings 14 and the wiring board 3 and electrically insulates the windings 14 and the wiring board 3. According to this embodiment, adjacent windings 14 of different phases can electrically be insulated by the first insulating wall 21. The windings 14 and the wiring board 3 can electrically be insulated by the second insulating wall 22. Thus, according to this embodiment, the insulating component 2 as a single component can be used for achieving insulation between phases of adjacent windings 14 and ensuring insulating properties of the windings 14 and the wiring board 3.

According to this embodiment, the insulating component 2 further includes the third insulating wall 23 arranged between the wiring board 3 and the stator housing 4 and electrically insulates the wiring board 3 and the stator housing 4. Thus, according to this embodiment, the wiring board 3 and the stator housing 4 can electrically be insulated by the third insulating wall 23. Thus, more excellent insulating properties can be ensured by the insulating component 2 as a single component.

According to this embodiment, the insulating component 2 further includes the fixing unit 20 or 29 for fixing the wiring board 3 to a predetermined position of the stator 1. Thus, according to this embodiment, the wiring board 3 can be fixed to the predetermined position of the stator 1 by the fixing unit 20 or 29. As a result, the insulating component 2 as a single component can be used for determining the position of the wiring board 3 and fixing the wiring board 3 at the determined position as well as for achieving excellent insulating properties.

According to this embodiment, at least one through hole 31 is formed in the wiring board 3, and the fixing unit 20 as an example of the fixing unit of the insulating component 2 includes the first pawl part 20b passed through the through hole 31 to be engaged with the wiring board 3. Thus, the position of the wiring board 3 relative to the stator 1 can be determined and the wiring board 3 can be fixed at the determined position more reliably.

According to this embodiment, the fixing unit 29 as a different example of the fixing unit of the insulating component 2 includes the second pawl parts 29b, 29b in a pair engaged with the plane-direction opposite ends of the wiring board 3. This further functions to determine the position of the wiring board 3 relative to the stator 1 and fix the wiring board 3 at the determined position more reliably.

According to this embodiment, the insulating component 2 is made of resin. This achieves the above-described insulation effect more reliably. This also functions to easily form the insulating component 2 as an integrated component by resin molding, for example.

The present invention is not limited to the above-described embodiment but modifications, improvements, etc. can be covered by the present invention as long as such modifications, improvements, etc. are in a range that achieves the purpose of the present invention. According to the above-described embodiment, the insulating component includes the third insulating wall and the fixing unit as well as the first insulating wall and the second insulating wall. However, this is not the only configuration of the insulating component. The insulating component is only required to include the first insulating wall and the second insulating wall.

EXPLANATION OF REFERENCE NUMERALS

1 Stator
2 Insulating component
3 Wiring board
4 Stator housing
14 Winding
20, 29 Fixing unit
20b First pawl part
29b Second pawl part
21 First insulating wall
22 Second insulating wall
23 Third insulating wall
31 Through hole
32 Plane-direction opposite ends

What is claimed is:

1. An insulating component of a motor, the motor comprising a stator, a stator housing attached to the stator, multiple windings arranged in the stator, and a wiring board arranged at one axial end of the stator and used for wiring of the windings, the insulating component comprising:
   a first insulating wall arranged between adjacent ones of the windings of different phases and electrically insulating the adjacent windings;
   a second insulating wall arranged between the windings and the wiring board and electrically insulating the windings and the wiring board; and
   a third insulating wall arranged between the wiring board and the stator housing and electrically insulating the wiring board and the stator housing, wherein
   the second insulating wall is formed of an annular plate member, and
   the third insulating wall is formed of an open cylindrical member extending in a first axial direction of the stator, and a second axial direction of the stator opposite the first axial direction of the stator, from an inner peripheral edge of the second insulating wall.

2. The insulating component of the motor according to claim 1, further comprising a fixing unit for fixing the wiring board to a predetermined position of the stator.

3. The insulating component of the motor according to claim 2, wherein at least one through hole is formed in the wiring board, and
   the fixing unit includes a first pawl part passed through the through hole to be engaged with the wiring board.

4. The insulating component of the motor according to claim 2, wherein the fixing unit includes second pawl parts in a pair engaged with plane-direction opposite ends of the wiring board.

5. The insulating component of the motor according to claim 1, wherein the insulating component is made of resin.

* * * * *